United States Patent
Roberts et al.

(10) Patent No.: US 6,901,961 B2
(45) Date of Patent: Jun. 7, 2005

(54) DOUBLE DIAPHRAGM PUMP HAVING A SPOOL VALVE

(75) Inventors: C. Oakley Roberts, Edon, OH (US); Stephen D. Able, Bryan, OH (US)

(73) Assignee: Ingersoll-Rand Company, Woodcliff Lake, NJ (US)

(*) Notice: Subject to any disclaimer, the term of this patent is extended or adjusted under 35 U.S.C. 154(b) by 31 days.

(21) Appl. No.: 10/236,285

(22) Filed: Sep. 6, 2002

(65) Prior Publication Data

US 2004/0047749 A1 Mar. 11, 2004

(51) Int. Cl.[7] .............................................. F15B 13/042
(52) U.S. Cl. ......................... 137/625.66; 137/625.25; 251/367
(58) Field of Search ....................... 137/625.25, 625.66; 251/367

(56) References Cited

U.S. PATENT DOCUMENTS

| | | | | | |
|---|---|---|---|---|---|
| 3,202,170 A | * | 8/1965 | Holbrook | .................... | 251/367 |
| 3,384,122 A | * | 5/1968 | Harpman | .................... | 251/367 |
| 3,385,322 A | * | 5/1968 | Brandenberg | .......... | 137/625.66 |
| 3,719,199 A | * | 3/1973 | Mentink | ................ | 137/625.69 |
| 3,951,170 A | * | 4/1976 | Hill | ............................. | 251/367 |
| 3,960,166 A | * | 6/1976 | Linser | ................... | 137/625.69 |
| 4,021,016 A | * | 5/1977 | Hart | ........................... | 251/367 |
| 4,615,353 A | * | 10/1986 | McKee | ................. | 137/625.66 |
| 4,854,832 A | * | 8/1989 | Gardner et al. | ............ | 417/395 |

OTHER PUBLICATIONS

Model 20192 3–Way Poppet Valve Ingersoll Rand The Apparatus disclosed in the attached drawings was publicly disclosed prior to Sep. 6, 2001.

* cited by examiner

Primary Examiner—Gerald A. Michalsky
(74) Attorney, Agent, or Firm—Michael Best & Friedrich LLP

(57) ABSTRACT

A double diaphragm pump having a spool valve. The spool valve includes a housing that has a first end, a second end, and at least one housing aperture defined therethrough from the first end to the second end of the housing. The spool valve also includes end plates positioned at the first and second ends of the housing. The end plates include at least one plate aperture defined therein that is aligned with the housing aperture. The spool valve further includes at least one stiffening and retaining rod inserted through the plate apertures and the housing.

26 Claims, 7 Drawing Sheets

DOUBLE DIAPHRAGM PUMP HAVING A SPOOL VALVE

FIELD OF THE INVENTION

The present invention relates to a double diaphragm pump having a spool valve and, more particularly, to a spool valve having a housing stiffening assembly.

BACKGROUND OF THE INVENTION

Air operated double diaphragm pumps are known for pumping a wide variety of substances. In some applications, double diaphragm pumps are utilized to pump chemicals such as acids. In other applications, double diaphragm pumps are utilized to pump comestible substances such as flowable foods and beverages. In these applications, the pumps are typically constructed of non-metallic materials (e.g. polymeric materials) having suitable corrosion resistance, and that are chemically compatible with the substances being pumped.

To operate the double diaphragm pump, an air valve is often provided with a flow control spool valve that regulates the flow of air through the air valve to reciprocatingly drive diaphragms of the double diaphragm pump. The spool valve generally includes a valve housing that defines a valve chamber, and a spool that is received by the valve chamber. The spool includes a plurality of sealing disks that delimit the chamber into two or more subchambers. Inlets and outlets are defined by the housing, and the spool is slidably movable within the valve chamber such that the sealing disks, and therefore the subchambers move along the chamber to provide selective communication between various combinations of the inlets and outlets.

Relatively high pressures are created within the air valves and may cause the valve housing constructed of the non-metallic materials to deform, which can result in valve leakage.

SUMMARY OF THE INVENTION

The present invention provides a spool valve that includes a housing that has a first end, a second end, a housing aperture defined therethrough from the first end to the second end of the housing, and a valve chamber defined in the housing. The spool valve also includes an end plate positioned at one of the first and second ends of the housing. The end plate includes a plate aperture defined therein. The plate aperture is substantially aligned with the housing aperture. The spool valve further includes a stiffening and retaining rod inserted through the housing aperture and the plate aperture and a spool slidably positioned within the valve chamber.

The present invention also provides a spool valve for a pump. The spool valve includes a housing that has a first end, a second end, a plurality of housing apertures defined in the housing, and a valve chamber defined in the housing. The plurality of housing apertures extend from the first end to the second end. The spool valve also includes a stiffening assembly coupled to the housing through the housing apertures to provide flexural rigidity to the housing, a spool slidably positioned within the valve chamber, and a valve insert carried by the spool for movement therewith.

The present invention further provides a double diaphragm pump that includes a pump housing that defines first and second pumping chambers and a first diaphragm and a second diaphragm housed in the first and second pumping chambers respectively. Each diaphragm divides a respective pumping chamber into a first subchamber and a second subchamber. The diaphragms are coupled to each other for reciprocating movement within the pumping chambers. The pump also includes an inlet manifold coupled to the pump housing and communicating with at least one of the first subchambers, an outlet manifold coupled to the pump housing and communicating with at least one of the first subchambers, and a spool valve coupled to the pump housing and fluidly communicating with the second subchambers to reciprocatingly drive the diaphragms. The spool valve includes a spool valve housing that has a first end, a second end, a housing aperture defined in the spool valve housing from the first end to the second end of the spool valve housing, and an end plate positioned at one of the first and second ends of the spool valve housing. The end plate includes a plate aperture defined therein. The plate aperture is substantially aligned with the housing aperture. The spool valve also includes a stiffening and retaining rod inserted through the housing aperture and the plate aperture.

The present invention further yet provides a valve for a pump. The valve includes a housing having a first end, a second end, and a plurality of housing apertures defined in the housing. The plurality of housing apertures extend from the first end to the second end. The valve also includes a substantially square end plate positioned at one of the first and second ends of the housing and has four plate apertures defined therein. Each plate aperture is disposed relatively near a corner of the end plate and is substantially aligned with one of the plurality of housing apertures. The valve further includes a plurality of stiffening and retaining rods. Each stiffening and retaining rod is inserted through an aligned housing aperture and plate aperture.

Other features and advantages of the invention will become apparent to those skilled in the art upon review of the following detailed description, claims, and drawings.

Figure 1:
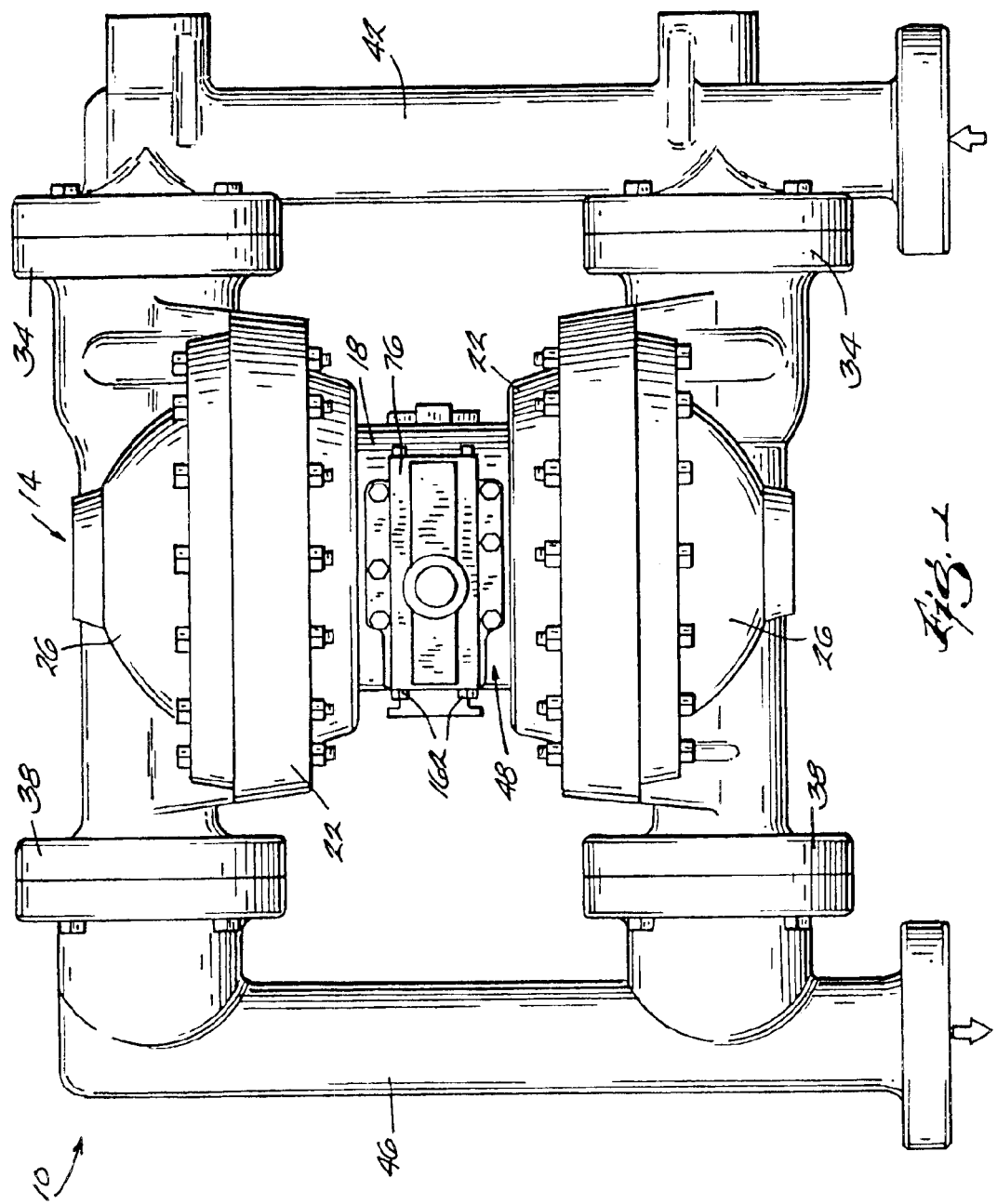
FIG. 1 is a front perspective view of an air operated double diaphragm pump assembly embodying the invention and including a spool valve.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 2:
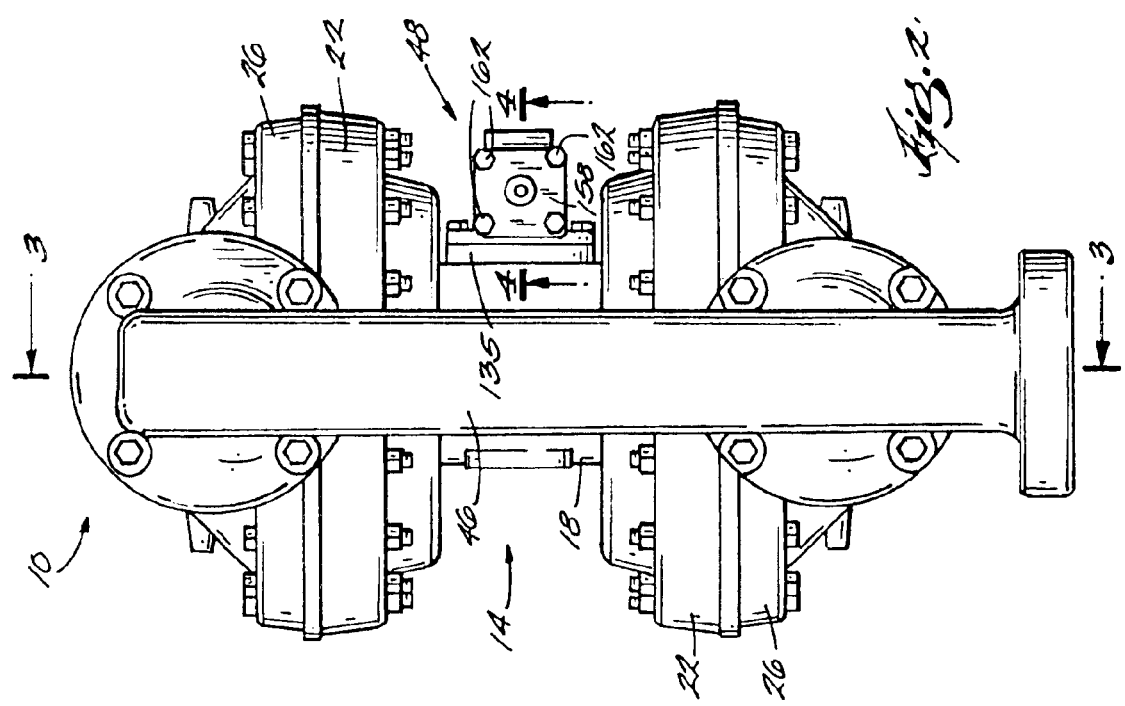
FIG. 2 is a left side view of the air operated double diaphragm pump including the spool valve, shown in FIG. 1.
Figure 3:
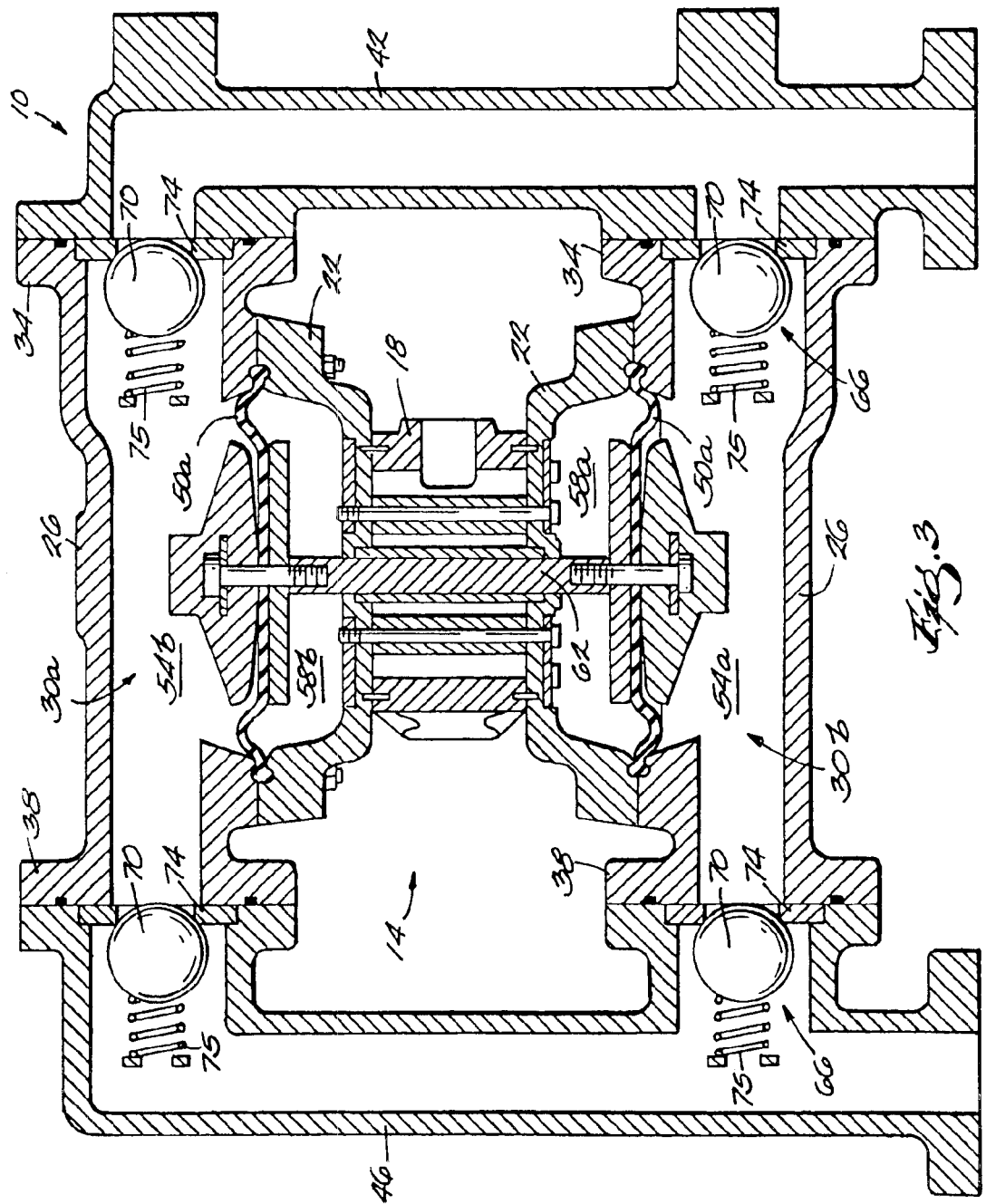
FIG. 3 is a sectional view taken along line 3—3 of FIG. 2.

FIGS. 1–3 illustrate an air operated double diaphragm pump 10 embodying the invention. The pump 10 includes a main pump housing assembly 14 that includes a centerbody 18, a pair of opposed air caps 22 coupled to the centerbody 18, and a pair of opposed fluid caps 26 coupled to the air caps 22 and cooperating therewith to define a pair of pumping chambers 30a, 30b (see FIG. 3). Each fluid cap 26 includes an inlet flange 34 and an outlet flange 38. The inlet flanges 34 are coupleable, independently or in combination, to an inlet manifold 42. Similarly, the outlet flanges 38 are coupleable, independently or in combination, to an outlet manifold 46. The flanges 34, 38 and manifolds 42, 46 can be configured such that the pumping chambers 30a, 30b operate in parallel to pump a single fluid (as illustrated), pump two fluids independently of each other, or mix two pumped fluids together in the outlet manifold 46. An air valve or spool valve 48 is secured to the centerbody 24 and is configured to drive the pump 10, as will be described further below.

With reference to FIG. 3, flexible diaphragms 50a, 50b are secured within respective pumping chambers 30a, 30b between the associated air cap 22 and fluid cap 26. The diaphragm 50a delimits the pumping chamber 30a into a first subchamber 54a and a second subchamber 58a. Similarly, the diaphragm 50b delimits the pumping chamber 30b into a first subchamber 54b and a second subchamber 58b. The first subchambers 54a, 54b communicate with the inlet manifold 42 and the outlet manifold 46, and the second subchambers 58a, 58b communicate with the spool valve 48.

Figure 4:
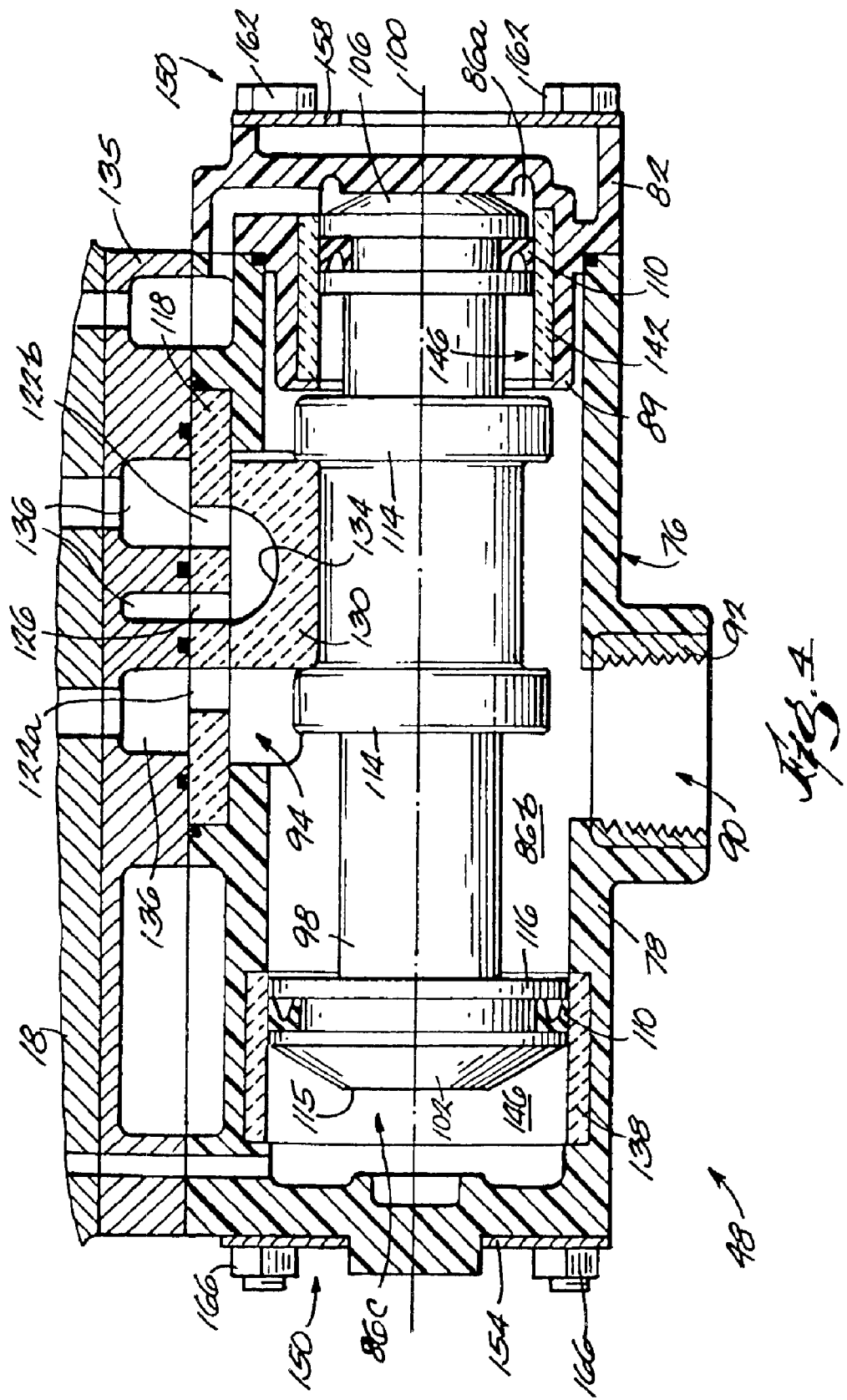
FIG. 4 is a sectional view of the spool valve taken along line 4—4 of FIG. 2 with the spool valve in a first position.

With reference to FIGS. 3 and 4, the diaphragms 50a, 50b are coupled to each other by a diaphragm rod 62 that is slidingly coupled to the centerbody 18. During pump operation, the diaphragm rod 62 reciprocates and the diaphragms 50a, 50b deflect within the pumping chambers 30a, 30b to increase and decrease the size of the first subchambers 54a, 54b, and the second subchambers 58a, 58b.

To regulate fluid flow through the pump 10, the outlet manifold 46 and the inlet flanges 34 include check valves 66. The illustrated check valves 66 are ball check valves and include a valve ball 70 and a valve seat 74. In the illustrated embodiment, a spring 75 is illustrated and is operable to bias the valve ball 70 toward the valve seat. Although illustrated, the spring 75 is not necessary for proper operation of the pump 10. In other embodiments, the check valves can also be ball check valves that include a valve ball, a valve seat, and a ball track within which the valve ball slides toward and away from the valve seat. The check valves 66 operate in a known manner to allow fluid to flow substantially in a single direction from the inlet manifold 42 toward the outlet manifold 46. Other types of check valves, such as flapper valves, can also be used as well and still be within the spirit and scope of the invention. In other embodiments, the check valves 66 can be formed integrally with the inlet and outlet manifolds, 42, 46, or integrally with the fluid caps 26. In still other embodiments, the check valves 66 can be completely separate assemblies that are positioned and secured between the manifolds 42, 46 and the fluid caps 26 upon assembly of the pump 10.

Figure 5:
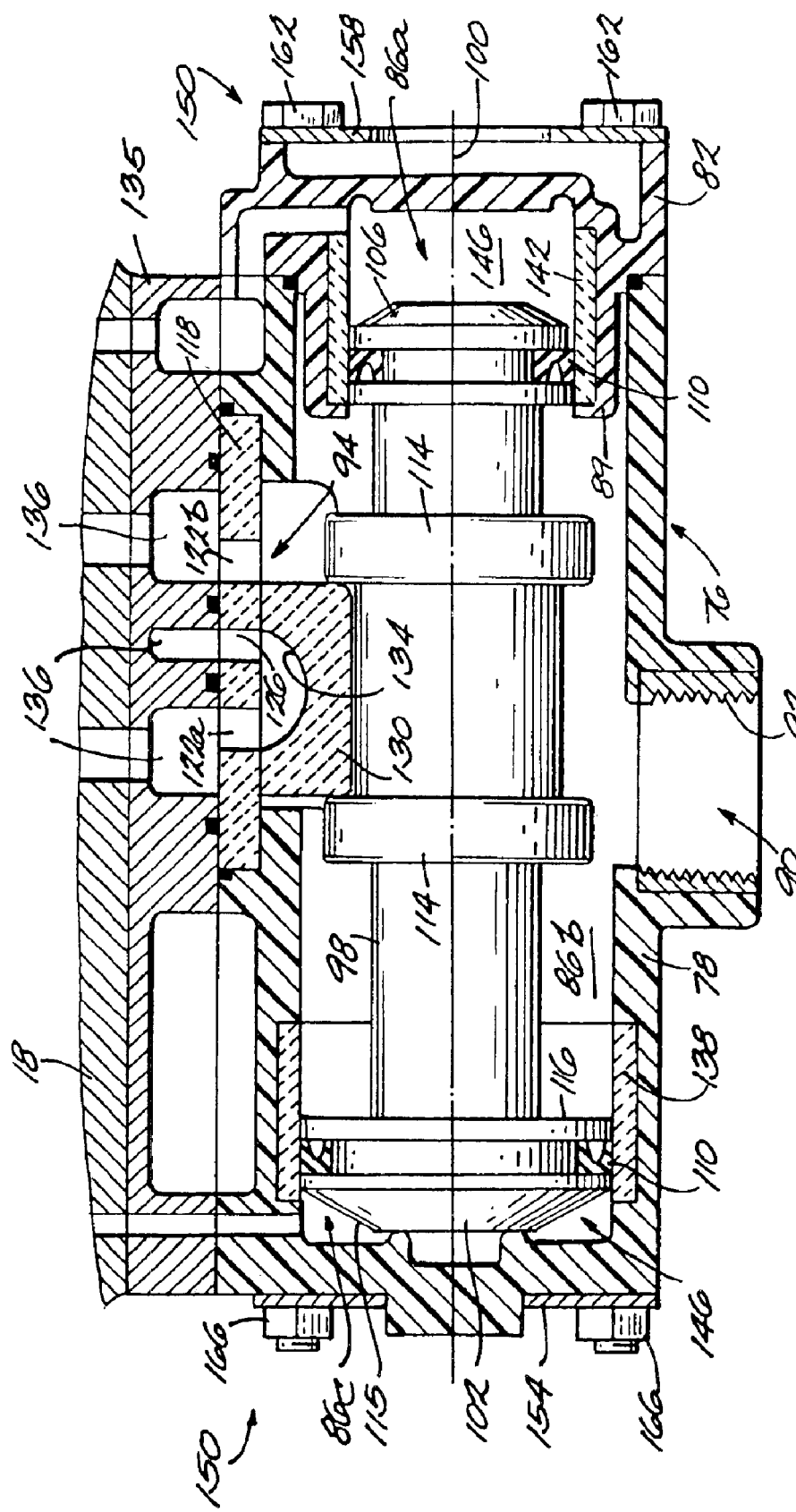
FIG. 5 is a similar sectional view to that of FIG. 4 with the spool valve in a second position.

Referring now to FIGS. 4 and 5, the spool valve 48 includes a housing 76 having a valve block 78 and a valve cap 82 that are coupled to one another and cooperate to define a generally cylindrical valve chamber 86. The illustrated valve cap 82 includes a portion 89 that is received by the valve block 78 and secured thereto by a plurality of stiffening and retaining rods 162 (discussed in greater detail below). The valve block 78 defines an inlet opening 90 near a central portion thereof that communicates with the valve chamber 86. The inlet opening 90 can include a threaded insert 92 such that a source of pressurized fluid, such as air, can be coupled to the inlet opening 90, thereby increasing the pressure within the valve chamber 86. The inlet opening 90 can also be coupled to the pressurized air source using other known connections, such as air nipples and the like. The valve block 78 also defines an outlet opening 94 that provides fluid communication between the valve chamber 86 and the centerbody 18, as well as other pump components.

A valve spool 98 is positioned within the valve chamber 86 and is slidably movable therein for reciprocation along a valve axis 100. The valve spool 98 is movable between a first position (shown in FIG. 4) where the valve spool 98 is shifted toward the valve cap 82, and a second position (shown in FIG. 5) where the valve spool 98 is shifted away from the valve cap 82. The illustrated valve spool 98 includes a large end 102, a small end 106, and a generally resilient annular seal 110 surrounds each end 102, 106. The seals 110 engage the valve block 78 and the valve cap 82 to delimit the valve chamber 86 into valve subchambers 86a, 86b, 86c. The valve spool 98 also includes two radially extending collars 114 positioned between the ends 102, 106. During operation of the illustrated pump 10, subchamber 86a is substantially always vented to the atmosphere, subchamber 86b is substantially always at an elevated pressure, and subchamber 86c alternates between the elevated pressure and atmospheric pressure. The changes in pressure within the subchamber 86c reciprocatingly drive the valve spool 98 between the first and second positions. Specifically, an end surface 115 of the valve spool 98 faces the subchamber 86c, and an annular surface 116 of the valve spool 98 faces the subchamber 86b. The surface area of the annular surface 116 is less than the surface area of the end surface 115 such that, when an equal pressure is applied to both surfaces (as is the case when the subchamber 86c is at the elevated pressure), the total force acting upon the end surface 115 is greater than the total force acting on the annular surface 116. The valve spool 98 is therefore urged toward the first position, which is referred to as the "piloted position". When the subchamber 86c is vented to the atmosphere, the total force on the end surface 115 is reduced, and the pressure applied to the annular surface 116 moves the valve spool 98 toward the second position.

Positioned in the outlet opening 94 of the valve block 78 is a valve plate 118. The valve plate 118 defines a pair of fill orifices 122a, 122b, and an exhaust orifice 126 positioned between the fill orifices 122a, 122b. The valve plate 118 substantially overlies the outlet opening 94 such that air flowing out of the valve chamber 86b flows through at least one of the fill orifices 122a, 122b. A valve insert 130 slidably engages the valve plate 118, is positioned between the radially extending collars 114 of the valve spool 98, and is carried by the valve spool 98 for reciprocating movement therewith. The valve insert 130 includes a concave recess 134 that is shaped and configured to provide fluid communication between a selected one of the fill orifices 122a, 122b and the exhaust orifice 126, depending upon the position of the valve spool 98 in the valve chamber 86. An adapter plate 135 is positioned between the spool valve 48 and the centerbody 18 and provides communication channels 136 that afford communication between the fill and exhaust orifices 122a, 122b, 126, and the centerbody 18.

Differently configured adapter plates 135 can be provided such that the spool valve 48 can be used with a variety of pump centerbodies. The adapter plate 135 and the centerbody 18 cooperate to afford communication between the fill orifices 122a, 122b and the second subchambers 58a, 58b.

As illustrated in FIG. 4, the fill orifice 122a is open to the valve subchamber 86b, and the fill orifice 122b is in communication with the exhaust orifice 126 by way of the concave recess 134. As such, pressurized air flows from the valve subchamber 86b, through the fill orifice 122a, and into the second subchamber 58a. The increased pressure in the second subchamber 58a causes the diaphragm 50a to deflect such that the volume of the second subchamber 58a increases, and the volume of the first subchamber 54a decreases. As a result of the volume changes, fluid within the first subchamber 54a is expelled into the outlet manifold 46. Simultaneously, due to the connection provided by the diaphragm rod 62, the diaphragm 50b deflects such that the first subchamber 54b increases in volume and the second subchamber 58b decreases in volume. Air within the second subchamber 58b can be vented to the atmosphere in several manners. In one embodiment, the air is vented via the fill orifice 122b, the concave recess 134, and the exhaust orifice 126. In another embodiment, the air can be vented to the atmosphere via a dump valve (not shown) positioned in fluid communication with the second subchamber 58b to directly vent the air to the atmosphere. The increase in volume of the first subchamber 54b draws fluid past the associated check valve 66 and into the first subchamber 54b from the inlet manifold 42.

When the diaphragms 50a, 50b and the diaphragm rod 62 reach the end of their travel, a pilot valve (not shown) is operated, which causes the pressure within the valve chamber 86c to change such that the valve spool 98 moves within the valve chamber 86, thereby moving the valve insert 130. Movement of the valve insert 130 changes the flow configuration of the fill orifices 122a, 122b such that the fill orifice 122b is in communication with the pressurized valve chamber 86b and the fill orifice 122a is in communication with the exhaust orifice 126 by way of the concave recess 134 (as shown in FIG. 5). As a result, the diaphragms 50a, 50b move in an opposite direction to that discussed above.

As such with reference to FIG. 5, pressurized air flows from the valve subchamber 86b, through the fill orifice 122b, and into the second subchamber 58b. The increased pressure in the second subchamber 58b causes the diaphragm 50b to deflect such that the volume of the second subchamber 58b increases, and the volume of the first subchamber 54b decreases. As a result of the volume changes, fluid within the first subchamber 54b is expelled into the outlet manifold 46. Simultaneously, due to the connection by the diaphragm rod 62, the diaphragm 50a deflects such that the first subchamber 54a increases in volume and the second subchamber 58a decreases in volume. Air within the second subchamber 58a can be vented to the atmosphere is several manners. In one embodiment, the air is vented via the fill orifice 122a, the concave recess 134, and the exhaust orifice 126. In another embodiment, the air can be vented to the atmosphere via a dump valve (not shown) positioned in fluid communication with the second subchamber 58a to directly vent the air to the atmosphere. The increase in volume of the first subchamber 54a draws fluid past the associated check valve 66 and into the first subchamber 54a from the inlet manifold 42. The valve spool 98 and the diaphragms 50a, 50b reciprocate throughout pump operation to repeat this process.

Referring to FIGS. 4 and 5, to facilitate sealing within the valve chamber 86, the valve block 78 is provided with a first sealing insert 138, and the valve cap 82 is provided with a second sealing insert 142. Each insert 138, 142 is positioned in the valve chamber 86 to surround one of the ends 102, 106 of the valve spool 98. Each insert 138, 142 includes a generally cylindrical inner surface 146 that sealingly engages the associated annular seal 110. The inserts 138, 142 cooperate with the valve block 78 and at least partially define the valve chamber 86. The cylindrical inner surfaces 146 preferably provide sealing surfaces having a reduced surface roughness with respect to the surfaces of the valve block 78 and valve cap 82. For example, in the illustrated embodiment, the valve block 78 and the valve cap 82 can be fabricated of a glass filled polymer. Glass filled polymers are utilized in diaphragm pump applications for various reasons, some of which may include chemical compatibility, corrosion resistance, and strength. One general drawback to the use of glass filled polymers however is an increase in surface abrasiveness due to the reinforcing glass fibers. This surface abrasiveness can lead to accelerated seal wear and leaking. By providing the sealing inserts 138, 142, the surfaces upon which the seals 110 slide can be manufactured to have improved surface characteristics, thereby extending the life of the seals and reducing the likelihood of leakage between the valve chambers 86a, 86b, 86c. In addition, the inserts 138, 142 can be fabricated in such a way that dimensional stability (e.g., the roundness and diameter of the cylindrical inner surfaces 146) is improved when compared to traditional injection molding techniques.

In some embodiments, including the embodiment illustrated in FIG. 4, the inserts 138, 142 can be formed from a generally tubular fiber matrix composite material. One method of forming the inserts 138, 142 includes winding glass fibers around a mandrel, binding the fibers together with an epoxy matrix, and cutting the resulting section of composite tubing to appropriate lengths. Once the individual inserts 138, 142 are formed, the inserts can be positioned within appropriate injection molding dies and the valve block 78 and the valve cap 82 can be injection molded around the inserts 138, 142. It should be appreciated of course that other materials, such as metals, other composites, and polymers can be used in the fabrication of the inserts 138, 142 and that the inserts 138, 142 can be formed using other manufacturing techniques. Also, the valve block 78 and the valve cap 82 can be formed using other materials and manufacturing techniques and the inserts 138, 142 can be inserted within the valve block and the valve cap 82 by other methods, such as press fitting, for example.

During pump operation, the seals 110 engage the inner surfaces 146 of the inserts 138, 142. The length and positioning of the inserts 138, 142 is such that the seals 110 and the inserts 138, 142 are in substantially continuous sealing contact throughout movement of the valve spool 98 between the first and second positions.

Figure 6:
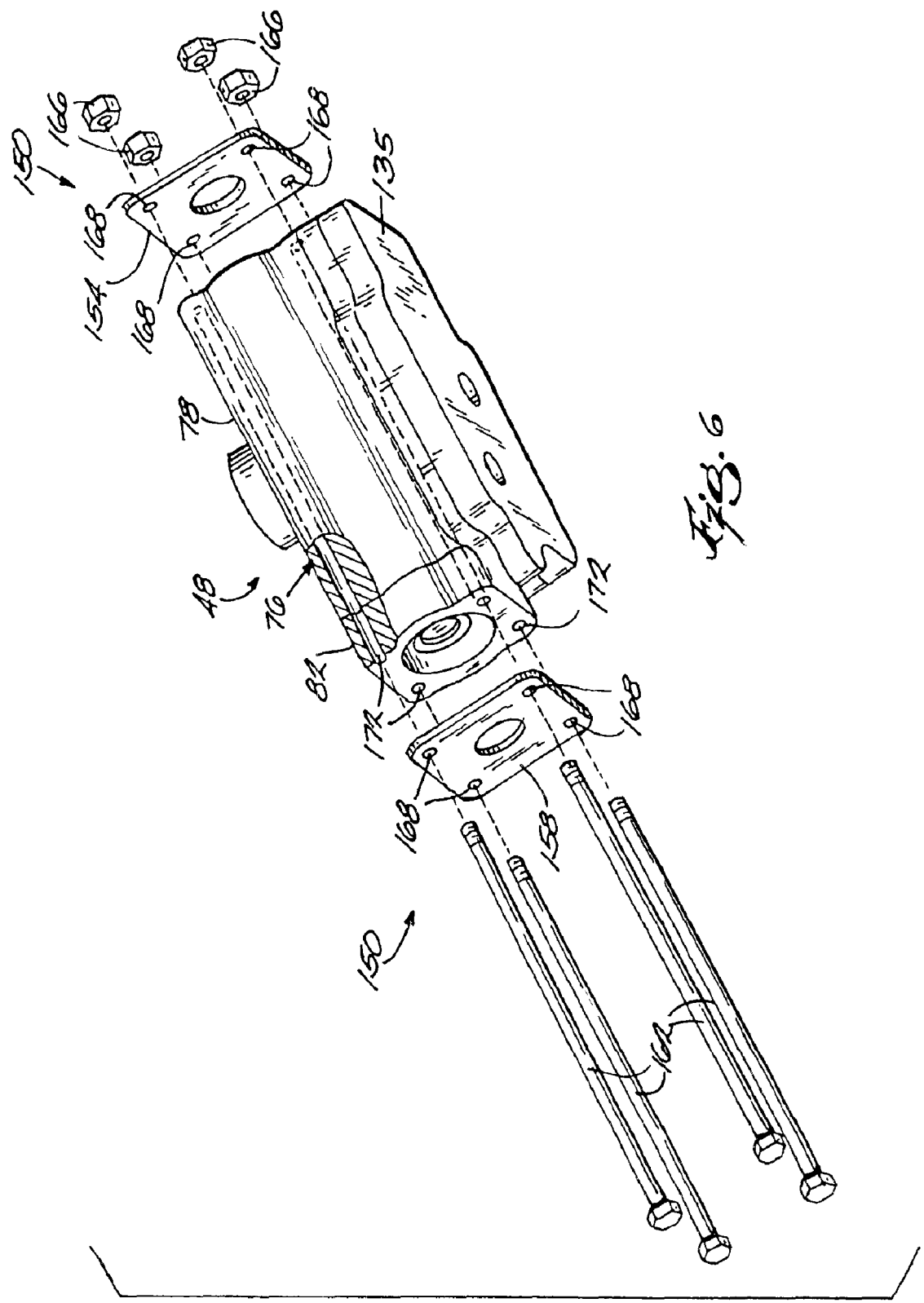
FIG. 6 is an exploded view of the spool valve, including a housing stiffening assembly.
Figure 7:
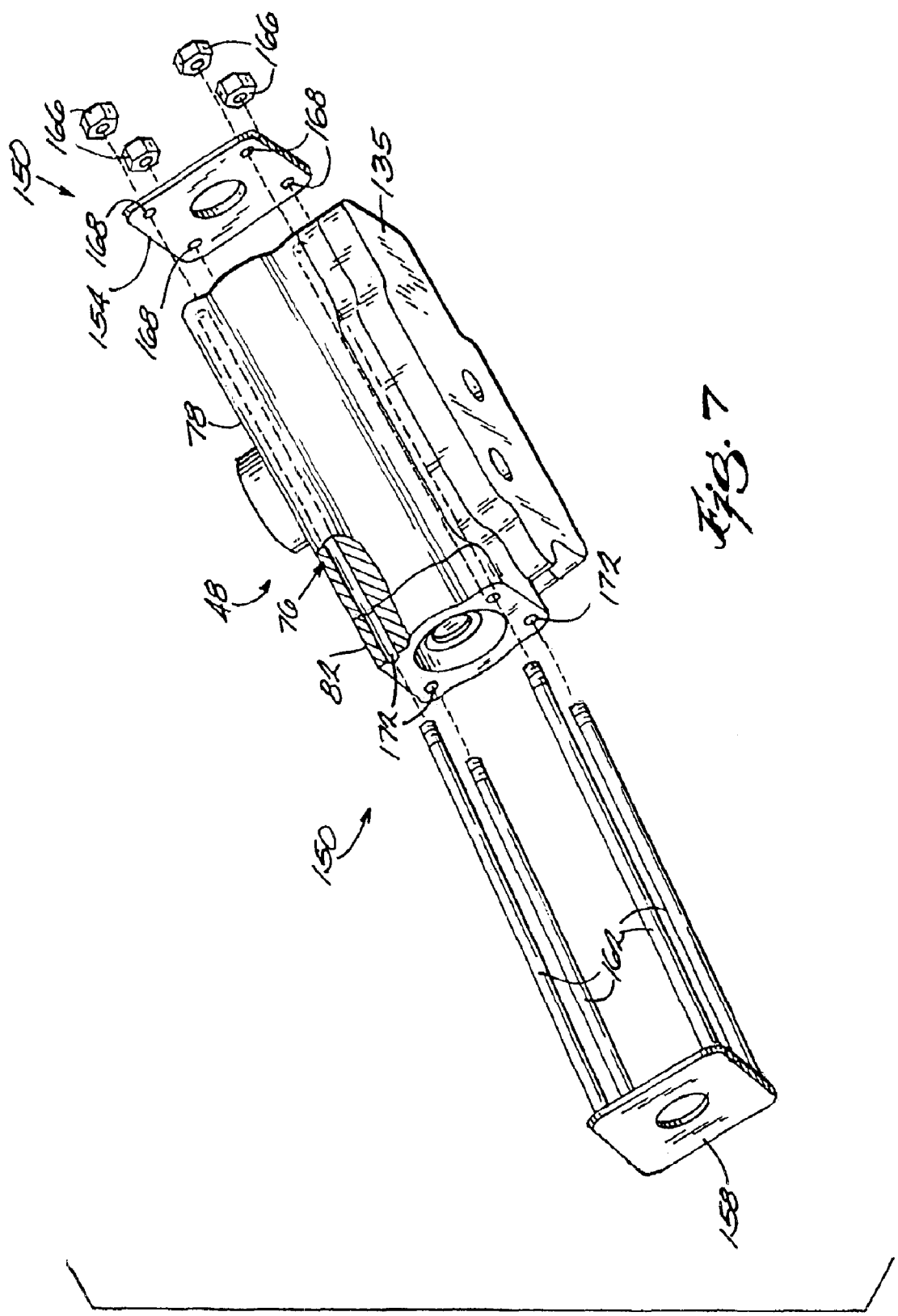
FIG. 7 is an exploded view of the spool valve, including an additional housing stiffening assembly.

Referring to FIG. 6, the spool valve 48 also includes a housing stiffening assembly 150. The housing stiffening assembly 150 includes a first end plate 154, a second end plate 158, a plurality of stiffening and retaining rods 162, and a plurality of nuts 166. The end plates 154, 158 are shaped and dimensioned to be substantially complementary to the shape of the housing 76 at first and second ends thereof, such that the end plates 154, 158 do not substantially extend beyond the periphery of the housing 76. In the illustrated embodiment, the end plates 154, 158 have a substantially square periphery, however, the end plates can take any shape and still be within the spirit and scope of the present invention. Each end plate 154, 158 includes a plurality of plate apertures 168 defined therein for receiving the plurality of rods 162. In the illustrated embodiment, the plurality of stiffening and retaining rods are a plurality of bolts, however, one of ordinary skill in the art will appreciate that the plurality of stiffening and retaining rods can take on other configurations and still be within the spirit and scope of the present invention. Also in the illustrated embodiment, the end plates 154, 158 and rods 162 are separate pieces. However, the fasteners can be integrally formed with one of the end plates or be bonded to one of the end plates by, for example, welding, soldering, brazing, etc. and still be within the sprit and scope of the present invention. Shown in FIG. 7 is a stiffening assembly 150 in which end plate 158 and rods 162 are integrally formed.

The stiffening assembly 150 is connected to the housing 76 by positioning the end plates 154, 158 at the first and second ends of housing 76, such that each of the plate apertures 168 aligns with one of a plurality of housing apertures 172 defined in the housing 76. The housing apertures 172 extend the length of the housing 76 between the first and second ends of the housing 76 and receive the plurality of rods 162 therein. The plurality of rods 162 are inserted from either end of the housing 76 through the plate apertures 168 in either the first or second end plate 154, 158 (depending from which end the rods are inserted), through the housing apertures 172, and through the plate apertures 168 in the other of the first or second end plate 154, 158. The rods 162 have a length sufficient to insert through the end plates 154, 158 and housing 76 as described above and project beyond both end plates 154, 158. The plurality of nuts 166 are then threaded onto the plurality of rods 162 and tightened. In a preferred embodiment, the end plates are made of a metallic material, however, the end plates can be made of other materials as will be readily apparent to those of ordinary skill in the art and still be within the spirit and scope of the present invention. In the illustrated embodiment, rods 162 have nuts 166 threaded thereto to couple the end plates 154, 158 to the housing 76, however, the end plates may be mounted to the housing in many manners, such as, for example, metallic rods that insert through the apertures in a manner similar to the rods 162 and are welded, soldered, brazed or otherwise bonded to both end plates and still be within the spirit and scope of the present invention.

Although particular constructions of the present invention have been shown and described, other alternative constructions will be apparent to those skilled in the art and are within the intended scope of the present invention. Thus, the present invention is to be limited only by the following claims.

What is claimed is:

1. A spool valve comprising:
   a non-metallic housing including a first end having a first valve cap, a second end having a second valve cap, a housing aperture defined therethrough from the first end to the second end of the housing, and a valve chamber defined in the housing between the first and second end caps;
   a metallic end plate positioned at each of the first and second ends of the housing and including a plate aperture defined therein, the plate aperture being substantially aligned with the housing aperture;
   a rod inserted through the housing aperture and the plate aperture; and
   a spool slidably positioned within the valve chamber.
2. The spool valve as claimed in claim 1, wherein the end plate is a first end plate and the plate aperture is a first plate aperture, the spool valve further including a second end plate positioned at the other of the first and second ends of the housing, the second end plate having a second plate aperture defined therein that is substantially aligned with the housing aperture.
3. The spool valve as claimed in claim 2, wherein the rod is inserted through the first plate aperture, the housing aperture, and the second plate aperture to secure the first and second end plates to the housing.
4. The spool valve as claimed in claim 1, wherein the housing aperture is a first housing aperture, the housing further including a second housing aperture, a third housing aperture, and a fourth housing aperture defined therein, the first, second, third, and fourth housing apertures being defined from the first end to the second end of the housing.
5. The spool valve as claimed in claim 4, wherein the housing is generally square in cross-section and each of the housing apertures is disposed relatively near one of the corners of the square housing.
6. The spool valve as claimed in claim 4, wherein the plate aperture is a first plate aperture, the end plate further including a second plate aperture, a third plate aperture, and a fourth plate aperture defined therein, each of the plate apertures being substantially aligned with one of the housing apertures.
7. The spool valve as claimed in claim 6, wherein the rod is a first rod, the spool valve further including a second rod, a third rod, and a fourth rod, each rod being inserted through an aligned housing and plate aperture.
8. The spool valve as claimed in claim 1, wherein the rod is a bolt.
9. The spool valve as claimed in claim 1, wherein the end plate and the rod are integrally formed.
10. The spool valve as claimed in claim 1, wherein the housing consists of a glass filled polypropylene material.
11. The spool valve as claimed in claim 1, wherein the end plate has a substantially similar shape to the first and second ends of the housing, such that the end plate does not substantially extend beyond a periphery of the housing upon securing the end plate to the housing.
12. The spool valve as claimed in claim 1, wherein the housing and the end plate are generally square in cross-section, such that the end plate does not substantially extend beyond a periphery of the housing after the end plate is secured to the housing.
13. The spool valve as claimed in claim 1, wherein the housing comprises a valve block and a valve cap, the housing aperture extending through both the valve block and the valve cap.
14. The spool valve as claimed in claim 13, wherein the end cap contacts a surface of the valve cap.
15. The spool valve as claimed in claim 13, wherein the valve cap is positioned between the end cap and the valve block.
16. The spool valve as claimed in claim 1, further comprising a valve insert carried by the spool for movement therewith.
17. The spool valve as claimed in claim 16, wherein the spool includes radially extending collars, the valve insert being positioned between the radially extending collars.
18. A spool valve for a pump, the spool valve comprising:
   a non-metallic housing including a first end having a first valve cap, a second end having a second valve cap, a plurality of housing apertures defined in the housing, and a valve chamber defined in the housing between the first and second caps, the plurality of housing apertures extending from the first end to the second end;

a stiffening assembly including a first metallic end plate and a second metallic end plate positioned at the first and second ends of the housing respectively, each end plate including a plurality of plate apertures defined therein that are each aligned with one of the housing apertures, the stiffening assembly couple to the housing through the plate apertures and the housing apertures to provide flexural rigidity to the housing;

a spool slidably positioned within the valve chamber; and a valve insert carried by the spool for movement therewith.

19. The spool valve as claimed in claim 18, wherein the stiffening assembly further includes a plurality of rods, each rod is inserted through aligned plate apertures and one of the housing apertures to secure the first and second end plates to the housing and provide flexural rigidity to the housing.

20. The spool valve as claimed in claim 19, wherein the plurality of rod is a plurality of bolts.

21. The spool valve as claimed in claim 18, wherein the housing consists of a glass filled polypropylene material.

22. The spool valve as claimed in claim 18, wherein the housing comprises a valve block and a valve cap, the plurality of housing apertures extending through both the valve block and the valve cap.

23. The spool valve as claimed in claim 18, wherein the spool includes radially extending collars, the valve insert being positioned between the radially extending collars.

24. A valve for a pump, the valve comprising:

a non-metallic housing including a first end having a first valve cap, a second end having a second valve cap, and a plurality of housing apertures defined in the housing, the plurality of housing apertures extending from the first end to the second end;

a substantially square metallic end plate positioned at each of the first and second ends of the housing and including four plate apertures defined therein, each plate aperture being disposed relatively near a corner of the end plate and being substantially aligned with one of the plurality of housing apertures; and a plurality of rods, each rod being inserted through an aligned housing aperture and plate aperture.

25. The valve as claimed in claim 24, wherein housing includes four housing apertures.

26. The valve as claimed in claim 24, wherein the valve includes four rods.

* * * * *